United States Patent
Pollard

[11] 3,899,063
[45] Aug. 12, 1975

[54] ROLLER MECHANISM FOR CONVEYING SYSTEMS

[76] Inventor: Orray R. Pollard, 31297 Granado, Palos Verdes, Calif. 92274

[22] Filed: Apr. 8, 1974

[21] Appl. No.: 459,055

[52] U.S. Cl. .................. 193/35 A; 188/130; 193/37
[51] Int. Cl. ............................................. B65g 13/00
[58] Field of Search ................. 193/35 R, 35 A, 37; 308/20; 188/84, 85, 130

[56] References Cited
UNITED STATES PATENTS
3,295,639  1/1967  Smith ............................... 193/37 X

*Primary Examiner*—Evon C. Blunk
*Assistant Examiner*—James L. Rowland
*Attorney, Agent, or Firm*—Lyon & Lyon

[57] ABSTRACT

A mechanism associated with roller conveyor systems for controlling the buildup of momentum in such systems during use. A hammer is mounted within one or more substantially cylindrical rollers on the axes thereof. Each hammer is prevented from rotating with the rollers but may pivot about an axes perpendicular to the axis of the roller. Resilient material is positioned about the hammer to resist this pivotal motion of the hammer. Anvils are positioned on the roller to rotate therewith and to engage the hammer. The hammer is capable of pivotally disengaging the anvils to allow resisted rotational motion of the rollers.

10 Claims, 6 Drawing Figures

PATENTED AUG 12 1975  3,899,063

ROLLER MECHANISM FOR CONVEYING SYSTEMS

The present invention is directed to a system for conveyor rollers to retard the momentum of the rollers during continuous use of the conveyor system.

Conveyor systems employing rollers have been used for conveniently moving products from point to point. Such rollers are especially effective when the conveyor system is on an incline. In such an instance, gravity will aid the motion of the products along the conveyor. However, there is one inherent disadvantage to such roller conveyor systems. When such a conveyor system is used substantially continuously over any period of time, the rollers will tend to gain momentum by virtue of the motion of the conveyed products. This will lead in turn to rapid movement of the products along the conveyor resulting in damaging collisions of products and other accidents.

Some systems have been devised for preventing this buildup of momentum in the rollers of a conveyor system. Fluid damping systems have been employed using vanes positioned in a fluid filled roller. Other systems employ conventional rollers filled with buckshot. Systems also employ eccentrically mounted pistons pumping fluid through orifices. Finally, rollers which are prevented from rotating are placed periodically along conveyors. All of these systems have significant drawbacks preventing their widespread acceptance. The systems are expensive, noisy, wear out quickly, interfere with the handling of products, and/or leak.

The present invention is designed to prevent a buildup of momentum within a roller used in a conveyor system through the periodic interference of a hammer fixed within the roller and anvils mounted to rotate therewith. The present system provides an inexpensive and long lasting device for controlling the momentum of the rollers within a conveyor. The use of a resiliently mounted hammer engaging anvils eliminates the leakage, tolerance and wear problems associated with fluid damping systems, reduces the noise and bearing damage characteristic of solid media damping systems, and yet allows normal operation of the rollers without excessive initial cost. Further, the amount of interference between the hammer and the anvils can be adjusted to increase or decrease the resistance of the individual rollers. Thus, an adjustable, self-contained roller system is disclosed having a low initial cost and a substantial degree of reliability.

Accordingly, it is an object of the present invention to provide an improved roller control system for roller conveyors.

It is another object of the present invention to provide a roller system employing a hammer and anvil arrangement for periodic engagement and resisted disengagement therebetween for the control of roller momentum.

It is yet another object of the present invention to provide a self-contained adjustable roller control system for roller conveyors.

It is a further object of the present invention to provide an improved damped roller assembly for a roller conveyor system.

Thus, an inexpensive and long lasting system is provided for controlling roller momentum. Other and further objects and advantages will appear hereinafter.

Figure 1:
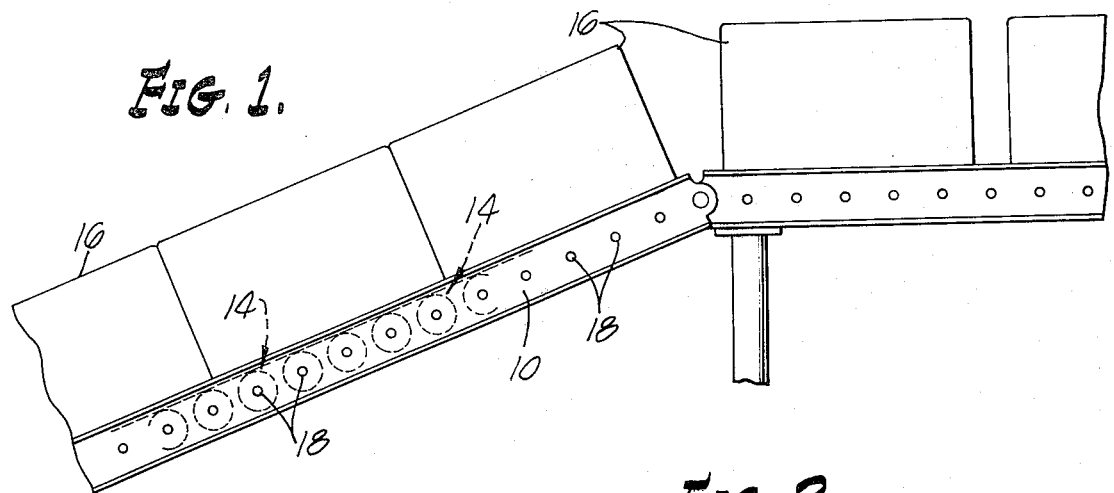
FIG. 1 is a side view of a roller conveyor system.

Turning specifically to the drawing, a conveyor system is illustrated as including side walls 10 and 12 between which are mounted rollers, generally designated 14. The conveyor system may be employed as shown in FIG. 1 to move products 16 thereupon. The rollers 14 are conventionally held in association with the side walls 10 and 12 by means of an extended axle 18 which engages the side walls 10 and 12. The axle 18 is conveniently of noncircular cross-section to prevent rotation thereof. In the present embodiment, the axle 18 is of hexagonal cross section. In this way, the rollers 14 may each be mounted between the side walls 10 and 12 on an axle 18.

Each roller 14 includes a tube 20 forming the outer portion thereof. The tube 20 is preferably circular in cross section and may be of any convenient length. The outer diameter of each roller is defined by the tube 20 and may be any convenient size. It is common to have roller diameters of around 4 to 5 inches for heavy duty use. A cylindrical lip 21 is provided at either end of the tube 20 to receive hubs 22. The hubs 22 are cylindrical and may be press fit into either end of the tube 20. The hubs 22 include a concentric circular bore for receipt of bearings 24. A shoulder 26 prevents each bearing 24 from moving laterally inwardly relative to each hub 22. The bearing 24 includes an inner race 28 which extends outwardly from the bearing to provide a thrust surface against either sidewall 10 and 12. In this way, the inner races 28 cooperate to retain the position of the rollers 14 within the side walls 10 and 12. To preclude movement of the axle 18 relative to the bearings 24, either end of the axle 18 may include a pin 29. Thus, the axle 18 is fixed relative to the side walls 10 and 12, and the roller assembly through the inner races 28 is also fixed.

The rollers 14 are allowed to rotate by virtue of the bearings 24 and can thereby establish a means for conveying products over a comparatively low friction system. At the same time the preferred embodiment includes a mechanism between the hubs 22 which periodically engages the nonrotating axle 18 with the rotating tube 20 to prevent this low friction system from building roller momentum during the continuous use of the conveyor system. The system can, therefore, combine the advantageous features of a roller conveyor system with the ability to prevent roller momentum buildup. Further, the number of rollers employing such a mechanism in each system may vary from all of the rollers to a few selected rollers positioned where momentum buildup is a problem.

Figure 3:
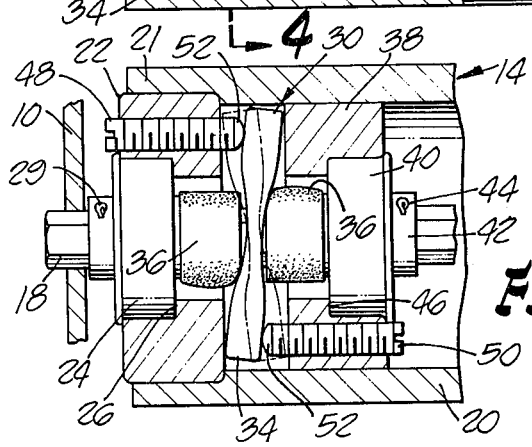
FIG. 3 is a detailed view of FIG. 2 illustrating the hammer in forced disengagement with the anvils.
Figure 4:
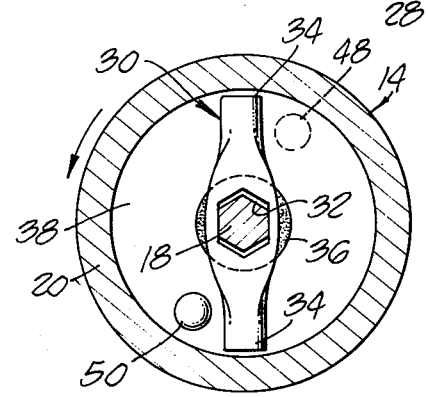
FIG. 4 is a cross-sectional view taken along line 4—4 of FIG. 2.

A hammer means is provided for establishing a fixed extension of the axle 18. The hammer means includes in the present embodiment, a hammer 30, which is illustrated as being conveniently fabricated from a tube pinched together in the center. A substantially hexagonal hole 32 is punched through the center of the hammer 30. This hole 32 is designed to fit over the hexagonal axle 18 and is oversized to allow pivotal motion of the hammer 30 about the axle 18 on an axis substantially perpendicular thereto. This movement of the hammer 30 is illustrated in FIG. 3. By virtue of the non-circular configuration of both the axle 18 and the hammer 30, the hammer 30 will not rotate about the centerline of the axle 18. Thus, the hammer 30 is allowed only to pivot as illustrated in FIG. 3. The hammer 30 extends to form two impact heads 34 at either end thereof. The heads 34 are substantially cylindrical.

On either side of the hammer 30, resilient constraining means are provided to retain the hammer 30 in position. The resilient constraining means are here provided by elastic collars 36 which fit about the axle 18. The collars 36 may conveniently be links of rubber tubing appropriately sized to fit about the axle 18. The collars 36 are forced against either side of the hammer 30 to prevent longitudinal movement of the hammer 30 along the axle 18. Further, the pivotal motion of the hammer 30 as seen in FIG. 3 is resisted by the collars 36. In this way, the collars 36 retain the orientation of the hammer 30 and allow movement thereof only by force.

On one side of the collar 36 and hammer 30 assembly, the inner race 28 of the bearing 24 provides a stop to prevent longitudinal movement of the collar 36. The second collar 36 is positioned by means of an inner hub 38 and a second bearing assembly 40. The second bearing assembly 40 similarly includes an inner race 42 which is held against the cylinder 36. The bearing assembly 40 is held in place on the axle 18 by means of a pin 44. A shoulder 46 on the inner hub 38 precludes movement of the hub 38 away from the hammer 30. The hub is also press fit into the tube 20 in order that it will not rotate relative to the tube 20. The positioning of the hub 22 and the inner hub 38 provides an enclosure for the system. This enclosing of the mechanism is beneficial because roller conveyor systems are often used in relatively dirty surroundings. The present embodiment prevents dirt and foreign objects from entering and binding or otherwise damaging the system.

Figure 2:
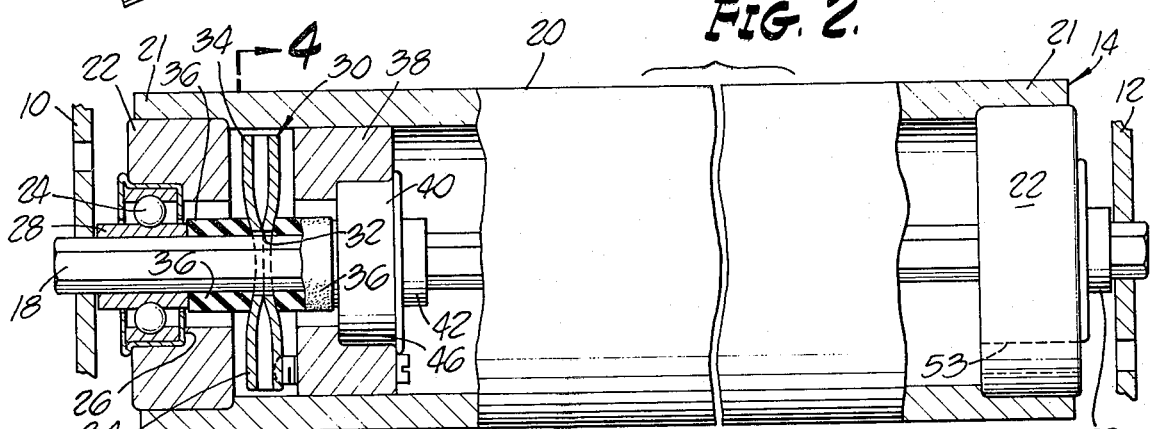
FIG. 2 is a cross-sectional view of the system of claim 1 wherein the outer portion of a roller is broken away for clarity.

Provided on hub 22 and hub 38 are anvil means which may be positioned to engage the hammer during rotation of the rollers. The anvil means are here provided by set screws 48 and 50. The set screws 48 and 50 extend through hubs 22 and 38 respectively. The anvils 52 provided at the inner end of each of the set screws 48 and 50 is rounded and may be positioned at varying depths through the hubs 22 and 38 to vary the degree of engagement between the anvils 52 and the impact heads 34 of the hammer 30. Thus, the anvils 52 may be positioned to interfere with the impact heads 34 and the hammer 30 to induce forced pivotal motion of the hammer 30 about an axis perpendicular to the center line of the axle 18. This motion is resisted by the elastic collars 36. Because the set screws 48 and 50 extend through the hubs 22 and 38, the positions of the anvils 52 may be controlled without dismantling the assembly. To add further convenience, holes may be formed in the sidewalls 10 and 12 to accomodate a conventional screw driver. In this way, adjustments can be made without dismantling the conveyor. In order that the set screw 50 may be reached in the present embodiment, a hole 53 is bored through the hub 22 as seen in FIG. 2. Where the roller is short and the hub 38 is also the outer hub 22, such a hole 53 is unnecessary.

The rounded impact heads 34 of the hammer 30 and the rounded anvils 52 of the set screws 48 and 50 insure that forced disengagement between the hammer 30 and the set screws 48 and 50 will occur. The set screws 48 and 50 may be positioned at a variety of locations within the hubs 22 and 38 to provide a range of resistances to the rotational motion of the roller 14 about the axle 18. The set screws 48 and 50 are established at opposed positions to bring about a uniform pivotal motion of the hammer 30. With each rotation of the roller 14, the anvils 52 will engage the hammer 30 such that the hammer 30 will be forced to pivot in both directions. This is intended to prevent a definite set in the collars 36 and hammer 30 which would reduce the effectiveness of the system.

Figure 5:
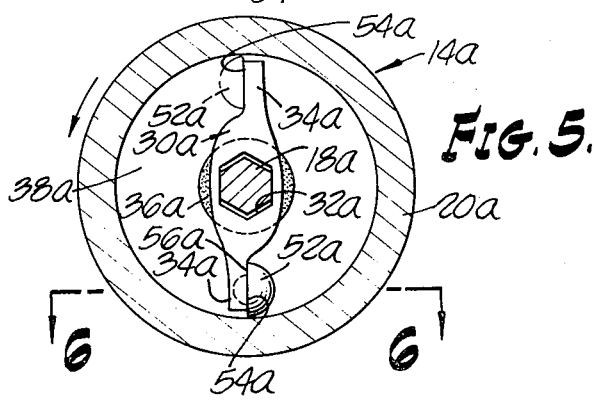
FIG. 5 is an alternate embodiment of the system as otherwise seen in FIG. 4.
Figure 6:
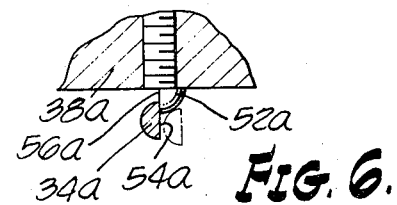
FIG. 6 is a cross-sectional view taken along line 6—6 of FIG. 5.

A second embodiment of the present invention is illustrated in FIGS. 5 and 6. This second embodiment is designed to prevent rotation of the roller 14a in one direction. The impact heads 34a of the hammer 30a are provided with a flat surface 54a positioned to engage a mating flat surface 56a on the back side of the anvils 52a. Because of the two mating flat surfaces 54a and 56a, torque on the roller 14 will not have a tendency to disengage the hammer 30a from the anvils 52a when rotated in the reverse direction. When rotated in the proper direction, i.e. counterclockwise as shown in FIG. 5, the rotational forces on the roller 14a will cause the rounded surfaces of the impact heads 34a and the anvils 52a to force the hammer 30 to pivot into disengagement therewith. In this way, a unidirectional roller may be provided. The anvils 52a are shown here to be larger than the set screw hole in the hubs. Consequently, the anvils must be positioned from the inside in this configuration. Naturally, smaller anvils can be employed which would allow external placement of the anvils.

Thus, an inexpensive, self-contained roller configuration is provided which allows periodic impact of an extension of the axle 18 with extensions of the roller 14 to prevent A buildup of angular velocity of the roller 14 when it is employed continuously over a period of time. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A roller braking mechanism comprising:
 a roller;
 an axle defining a first axis, said roller being rotatably mounted on said axle to rotate about said first axis;
 a hammer;
 hammer mounting means for mounting said hammer on said axle to prevent rotation of said hammer about said first axis;
 anvil means mounted on said roller and fixed to rotate with said roller, said anvil means extending to at least one position where said hammer and said anvil means will engage as said roller rotates; and
 resilient constraining means for resisting relative movement between said hammer and said anvil means in a direction along said first axis tending to disengage said anvil means and said hammer.

2. The mechanism of claim 1 wherein said anvil means include anvils extending to positions where said hammer and said anvils will engage as said roller rotates.

3. The mechanism of claim 2 wherein said anvils are disposed on either side of said hammer forcing said hammer to pivot in opposite directions about a second axis perpendicular to said first axis.

4. The mechanism of claim 3 wherein said hammer includes impact heads at either end thereof extending from said axle, said anvils being disposed to engage said impact heads.

5. The mechanism of claim 4 wherein said impact heads and said anvils are rounded to permit forced disengagement therebetween.

6. The mechanism of claim 4 wherein said impact heads and said anvils include flat mating surfaces thereon to prevent rotation of said anvils relative to said impact heads in one direction.

7. The mechanism of claim 1 wherein said resilient constraining means includes elastic collars positioned about said axle on either side of said hammer.

8. The mechanism of claim 1 wherein said hammer mounting means includes a noncircular hole located in said hammer and a section in said axle having a noncircular cross-sectional area about which said hammer is positioned.

9. A roller braking mechanism for a roller conveyor having an axle and a roller rotatably mounted on said axle to rotate about a first axis wherein the improvement comprises:

a hammer, said hammer being mounted on the axle to prevent rotation of said hammer about the first axis;

anvil means mounted on the roller and fixed to rotate with the roller, said anvil means extending to at least one position where said hammer and said anvil means will engage as the roller rotates; and resilient constraining means for resisting relative movement between said hammer and said anvil means in a direction along said first axis tending to disengage said anvil means and said hammer.

10. A roller braking mechanism comprising:

a roller;

an axle defining a first axis, said roller being rotatably mounted on said axle to rotate about said first axis;

a hammer;

hammer mounting means for mounting said hammer on said axle to prevent rotation of said hammer about said first axis, said hammer mounting means allowing pivotal movement about a second axis perpendicular to said first axis;

anvil means mounted on said roller and fixed to rotate with said roller, said anvil means extending to at least one position where said hammer and said anvil means will engage as said roller rotates; and resilient constraining means for resisting relative movement between said hammer and said anvil means in a direction along said first axis tending to disengage said anvil means and said hammer.

* * * * *